(12) United States Patent
Zhi et al.

(10) Patent No.: US 11,087,931 B2
(45) Date of Patent: Aug. 10, 2021

(54) ENERGY STORING ELECTRICAL DEVICE AND A METHOD OF CONSTRUCTING AN ELECTRICAL DEVICE

(71) Applicant: City University of Hong Kong, Kowloon (HK)

(72) Inventors: Chunyi Zhi, New Territories (HK); Yukun Wang, New Territories (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/003,380

(22) Filed: Jun. 8, 2018

(65) Prior Publication Data

US 2019/0378661 A1 Dec. 12, 2019

(51) Int. Cl.
*H01G 11/28* (2013.01)
*H01G 11/86* (2013.01)
(Continued)

(52) U.S. Cl.
CPC ............ *H01G 11/28* (2013.01); *A41D 1/002* (2013.01); *B32B 5/022* (2013.01); *B32B 15/095* (2013.01); *B32B 15/14* (2013.01); *C25D 15/00* (2013.01); *D06B 3/10* (2013.01); *D06M 11/83* (2013.01); *D06M 11/84* (2013.01); *H01G 11/10* (2013.01); *H01G 11/24* (2013.01); *H01G 11/30* (2013.01);
(Continued)

(58) Field of Classification Search
CPC ........ H01G 11/28; H01G 11/10; H01G 11/24; H01G 11/30; H01G 11/52; H01G 11/56; H01G 11/62; H01G 11/68; H01G 11/86; A41D 1/002; B32B 5/022; B32B 15/095; B32B 15/14; B32B 2262/0276; B32B 2457/00; C25D 15/00; D06B 3/10; D06M 11/83; D06M 11/84; D06M 2101/32; D06M 2200/00; D10B 2401/16; D10B 2501/06; D10B 2331/04
See application file for complete search history.

(56) References Cited

U.S. PATENT DOCUMENTS

2008/0265219 A1* 10/2008 Whitehead ........... C08G 61/124
252/511
2014/0029164 A1* 1/2014 Park ...................... H01G 11/40
361/502

(Continued)

OTHER PUBLICATIONS

Zhu M, Huang Y, et al. A Highly Durable, Transferable, and Substrate-Versatile High-Performance All-Polymer Micro-Supercapacitor with Plug-and-Play Function[J]. Advanced Materials, 2017, 29 160513 7.

(Continued)

*Primary Examiner* — Michael P Mcfadden
(74) *Attorney, Agent, or Firm* — Renner Kenner Greive Bobak Taylor & Weber

(57) ABSTRACT

A system and method for an energy storing electrical device includes a first conductive electrode, a second conductive electrode, an electrolyte disposed between the first conductive electrode and a second conductive electrode, each electrode further comprising an integrated first layer and a second layer, and; wherein the second layer comprises a substrate, the substrate comprising a textile portion or a polymer portion and a conductive layer formed by a noble metal disposed on and attached to the substrate.

40 Claims, 13 Drawing Sheets

(51) Int. Cl.
*H01G 11/24* (2013.01)
*H01G 11/56* (2013.01)
*H01G 11/62* (2013.01)
*H01G 11/52* (2013.01)
*H01G 11/68* (2013.01)
*H01G 11/10* (2013.01)
*D06M 11/83* (2006.01)
*D06M 11/84* (2006.01)
*D06B 3/10* (2006.01)
*A41D 1/00* (2018.01)
*B32B 15/095* (2006.01)
*B32B 15/14* (2006.01)
*B32B 5/02* (2006.01)
*C25D 15/00* (2006.01)
*H01G 11/30* (2013.01)
*D06M 101/32* (2006.01)

(52) U.S. Cl.
CPC ............ *H01G 11/52* (2013.01); *H01G 11/56* (2013.01); *H01G 11/62* (2013.01); *H01G 11/68* (2013.01); *H01G 11/86* (2013.01); *B32B 2262/0276* (2013.01); *B32B 2457/00* (2013.01); *D06M 2101/32* (2013.01); *D06M 2200/00* (2013.01); *D10B 2331/04* (2013.01); *D10B 2401/16* (2013.01); *D10B 2501/06* (2013.01)

(56) References Cited

U.S. PATENT DOCUMENTS

2014/0185260 A1\* 7/2014 Chen ................... H01G 11/24
  361/782
2016/0049259 A1\* 2/2016 Naito ..................... H01G 9/15
  361/528
2016/0179276 A1\* 6/2016 Nathan ................ G06F 3/0445
  345/174

OTHER PUBLICATIONS

Liu A, Kovacik P, et al. Monolithic Flexible Supercapacitors Integrated into Single Sheets of Paper and Membrane via Vapor Printing[J]. Advanced Materials, 2017, 29 1606091.

\* cited by examiner

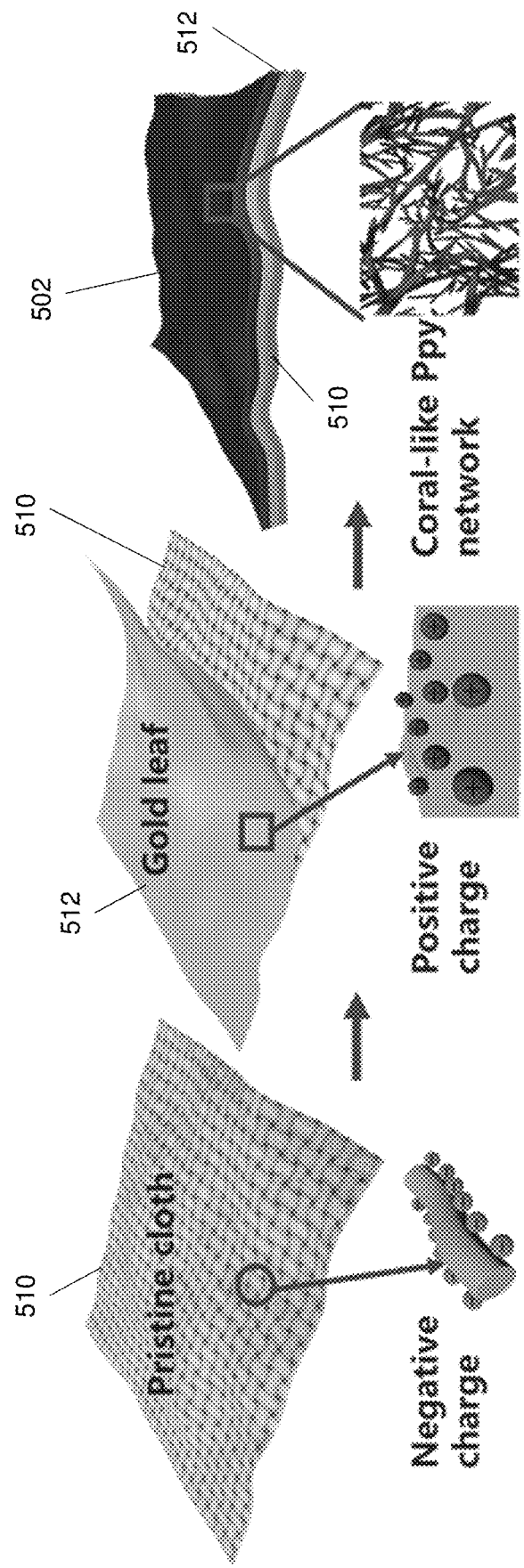

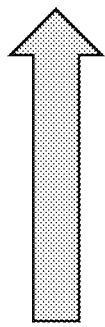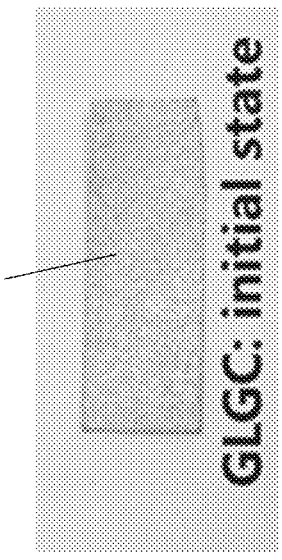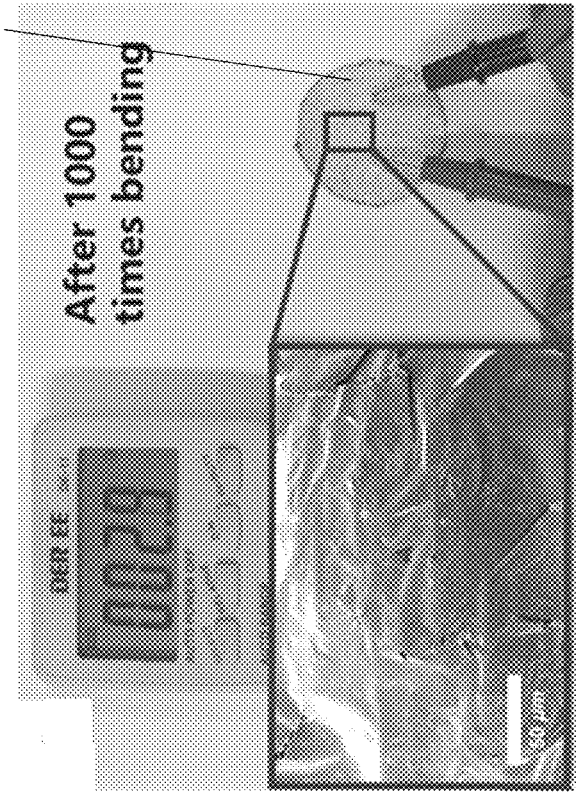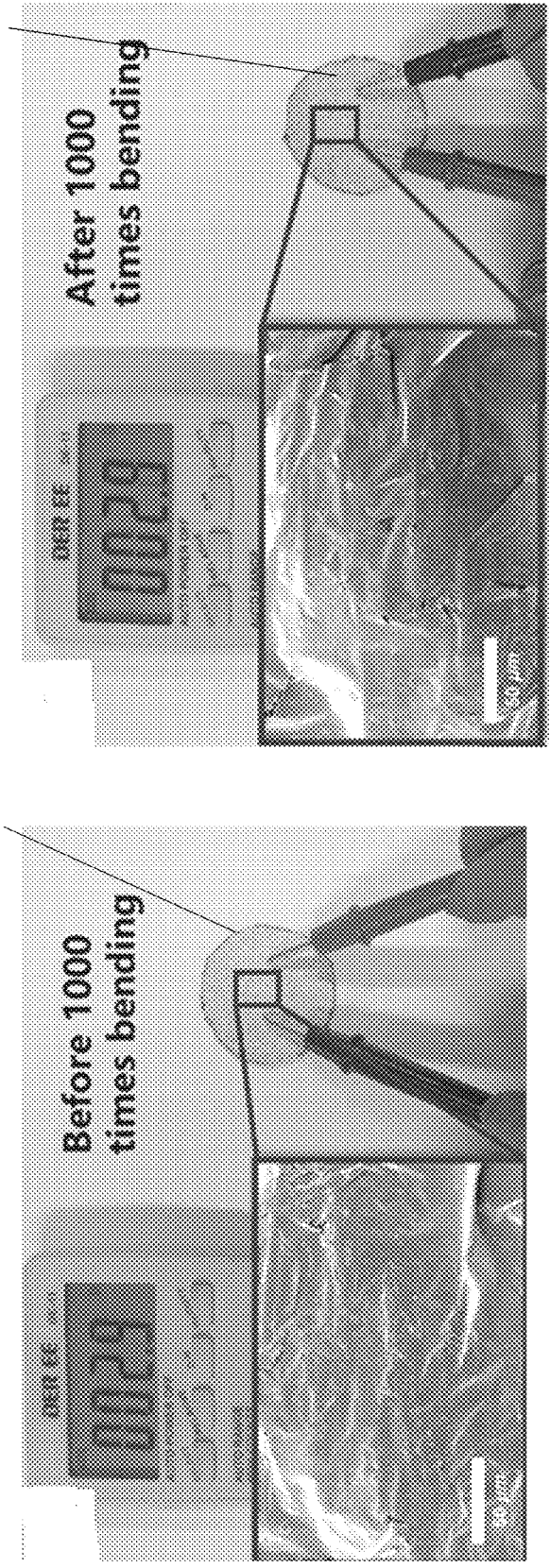
Fig.6a
Fig.6b
Fig.6c
Fig.6d

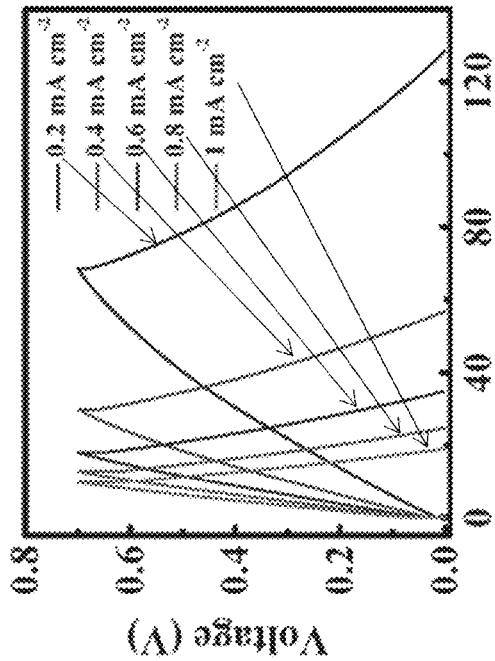
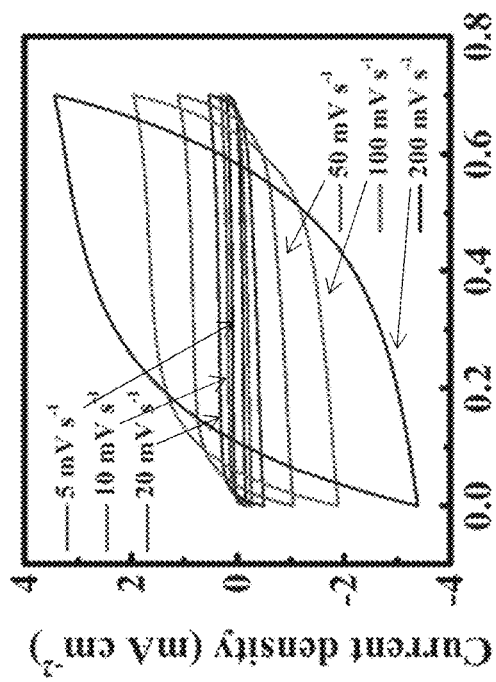
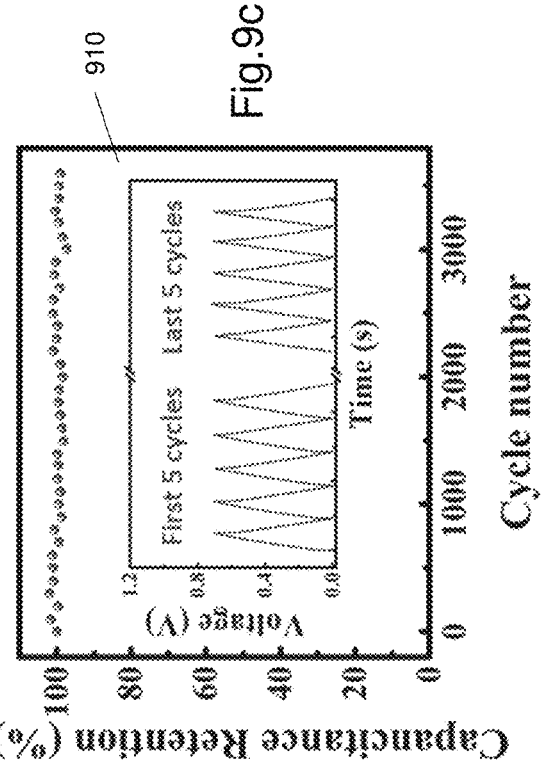

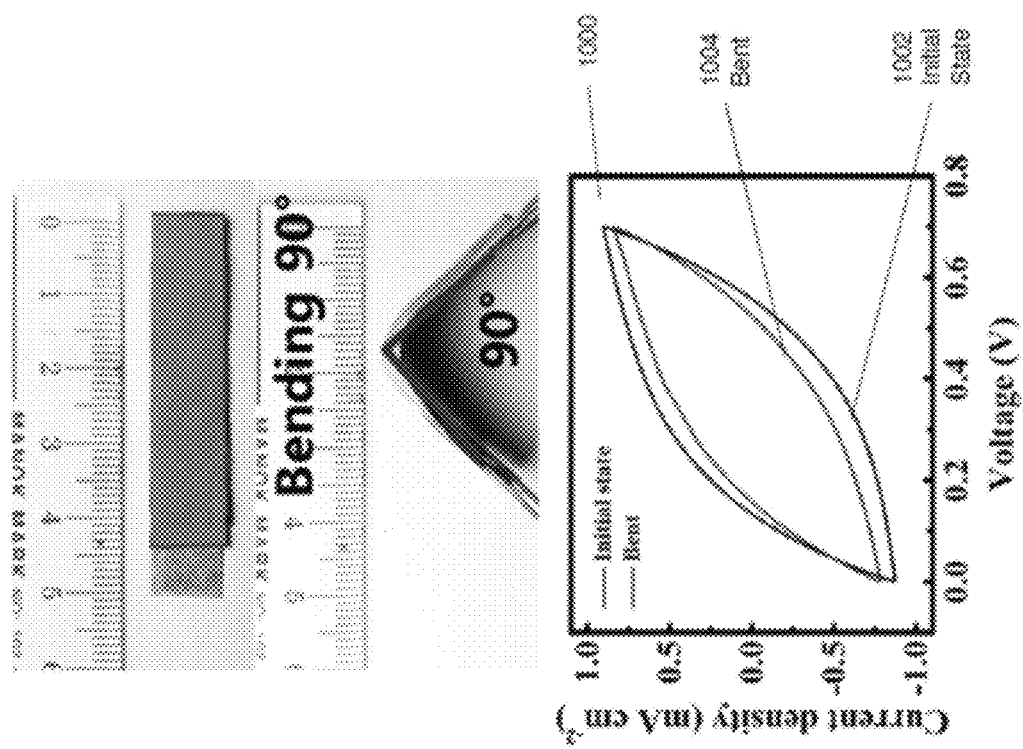

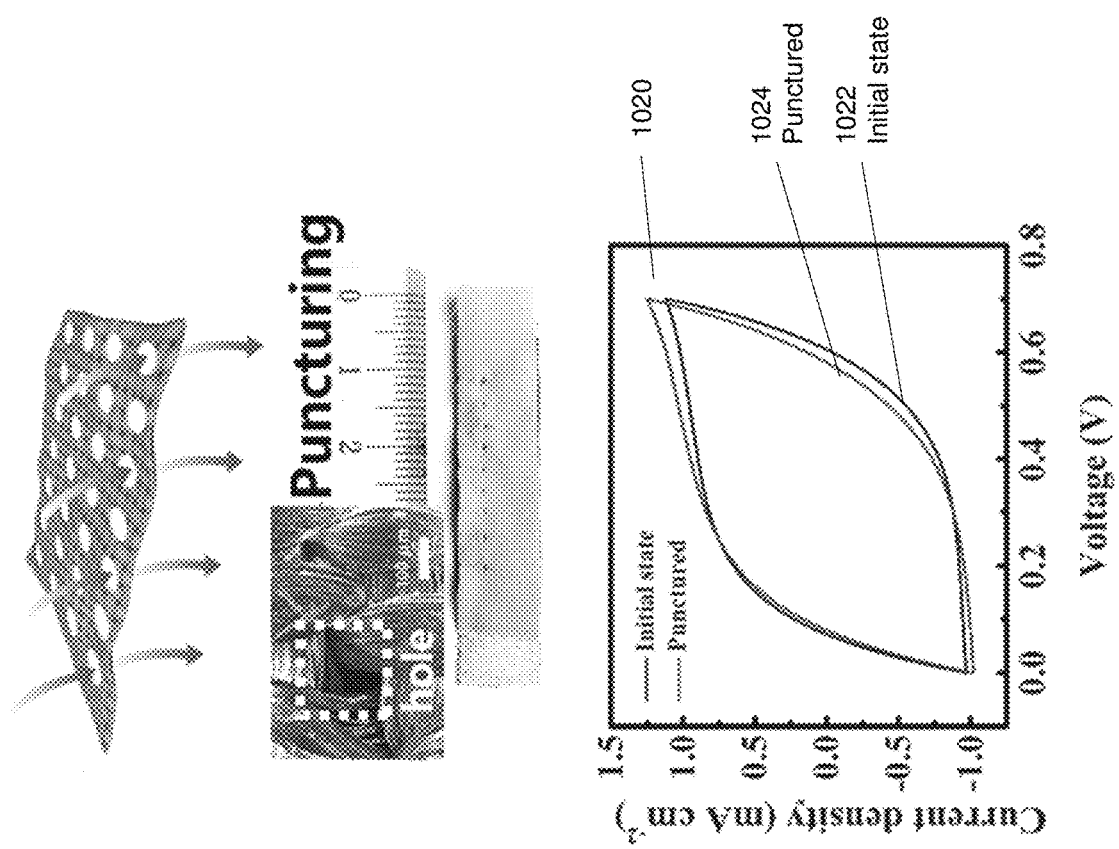

ENERGY STORING ELECTRICAL DEVICE AND A METHOD OF CONSTRUCTING AN ELECTRICAL DEVICE

TECHNICAL FIELD

The present disclosure relates to an electrical device, in particular but not limited to an energy storing electrical device. The present disclosure relates to a method of constructing an electrical device, in particular but not limited to a method of constructing an energy storing electrical device. The present disclosure also relates to an electrode of an electrical device and a method of constructing the same.

BACKGROUND

Electronics have become ubiquitous and widely used in the modern world. A wide range of products now incorporate electronic components to provide additional functionality. The use of electronics has also expanded into new fields as well as helped in the development of new products for a myriad of uses.

With the rapid development of smart electronic devices and wearable electronic devices, the requirement for high performance energy storage devices has also dramatically increased. There is a requirement for improved high performance energy storage devices.

SUMMARY OF THE INVENTION

It is an advantage of the present invention to provide an electrical device, in particular an energy storing electrical device or at least provide the public with a useful alternative.

It is also an object of the present invention to provide an improved energy storage device, or at least provide the public with a useful alternative.

Other advantages of the invention (or inventions) may become apparent from the following description and drawings, which is given by way of example only.

In accordance with a first aspect the present invention relates to an energy storing electrical device comprising:
a first conductive electrode,
a second conductive electrode,
an electrolyte disposed between the first conductive electrode and a second conductive electrode,
each electrode further comprising an integrated first layer and a second layer, and;
wherein the second layer comprises a substrate, the substrate comprising a textile portion or a polymer portion and a conductive layer formed by a noble metal disposed on and attached to the substrate.

In an embodiment the noble metal is gold.

In an embodiment the noble metal is gold and the gold is deposited onto the substrate by a gilding process.

In an embodiment the gold is a gold leaf that is applied to the substrate by a gilding process, the gold leaf being applied as a thin layer such that the gold leaf is laminated onto the substrate.

In an embodiment the gold is applied as layer comprising a thickness of less than 0.3 μm.

In an embodiment the gold is applied as a layer comprising a thickness between 0.05 μm and 0.15 μm.

In an embodiment the second layer comprises a textile portion and a noble metal being applied to the textile portion.

In an embodiment the textile portion comprises a multi-faceted textile sheet and wherein the noble metal is applied onto a single face of the textile sheet.

In an embodiment the textile portion is a polyester textile.

In an embodiment the polyester textile electrically non-conductive.

In an embodiment the second layer comprises a polymer portion and a noble metal being applied to the polymer portion.

In an embodiment the polymer portion comprises a multi-faceted polymer sheet and wherein the noble metal is disposed onto a single face of the polymer sheet.

In an embodiment the polymer sheet comprises a polyurethane polymer sheet.

In an embodiment the polyurethane polymer sheet is electrically non-conductive.

In an embodiment the substrate the textile portion or the polymer portion is negatively charged, the noble metal being positively charged and the noble metal being retained on the substrate by electrostatic interaction.

In an embodiment each electrode further comprises a layer of polypyrrole disposed on the second layer to form the first layer.

In an embodiment the layer of polypyrrole comprises polypyrrole nanorods or nanowires that are electrodeposited onto the second layer to define the first layer. Alternatively, the layer of polypyrrole may be provided as a film of polypyrrole material.

In an embodiment the electrolyte comprises an electrically conductive fluid or gel or hydrogel sandwiched between the first electrode and the second electrode.

In an embodiment the electrolyte comprises $H_2SO_4$.

In an embodiment the energy storing electrical device comprises a separator disposed between the first electrode and the second electrode.

In an embodiment the separator comprises a non-woven cloth.

In an embodiment the first layer is an electrode layer and the second layer is a current collector layer, wherein the electrode layer and the current collector layer are formed as a single unit and the single unit defining each of the first conductive electrode and second conductive electrode.

In an embodiment each electrode is substantially flexible about at least one axis.

In accordance with a further aspect the present invention relates to an electrode for use in an energy storing electrical device comprising:
a first layer,
a second layer coupled to the first layer,
wherein the second layer comprises a substrate, the substrate comprising a textile portion or a polymer portion and a conductive layer formed by a noble metal disposed on and attached to the substrate.

In an embodiment the first layer is an electrode layer and the second layer is a current collector layer, wherein the current collector layer and the electrode layer integrated together and forming a single unit defining the electrode for use in an energy storing electrical device.

In an embodiment the noble metal is gold.

In an embodiment the noble metal is gold and the gold is deposited onto the substrate by a gilding process.

In an embodiment the gold is a gold leaf that is applied to the substrate by a gilding process, the gold leaf being applied as a thin layer such that the gold leaf is laminated onto the substrate.

In an embodiment the gold is applied as layer comprising a thickness of less than 0.3 μm.

In an embodiment the gold is applied as a layer comprising a thickness between 0.05 μm and 0.15 μm.

In an embodiment the current collector layer comprises a textile portion and a noble metal being applied to the textile portion.

In an embodiment the textile portion comprises a multi-faceted textile sheet and wherein the noble metal is applied onto a single face of the textile sheet.

In an embodiment the textile portion is a polyester textile.

In an embodiment the polyester textile electrically non-conductive.

In an embodiment the current collector layer comprises a polymer portion and a noble metal being applied to the polymer portion.

In an embodiment the polymer portion comprises a multi-faceted polymer sheet and wherein the noble metal is disposed onto a single face of the polymer sheet.

In an embodiment the polymer sheet comprises a polyurethane polymer sheet.

In an embodiment the polyurethane polymer sheet is electrically non-conductive.

In an embodiment the substrate the textile portion or the polymer portion is negatively charged, the noble metal being positively charged and the noble metal being retained on the substrate by electrostatic interaction.

In an embodiment each electrode further comprises a layer of polypyrrole disposed on the second layer to define the first layer, wherein the first layer is an electrode layer.

In an embodiment the layer of polypyrrole comprises polypyrrole nanorods that are electrodeposited onto the second layer.

In accordance with a further aspect the present invention relates to a method of constructing an electrode for use in an energy storing electrical device, the method comprising the steps of:
providing a textile or polymer substrate,
placing the textile or polymer substrate onto a noble metal sheet,
compressing the textile or polymer substrate into the noble metal sheet for a time period such that the noble metal attaches to the textile or polymer substrate,
electrodepositing a conductive material.

In an embodiment the conductive material is a polypyrrole and the polypyrrole is electrodeposited onto the textile or polymer substrate.

In an embodiment the step of electrodepositing comprises electrodepositing polypyrrole nanorods at a constant current of 0.8 mA cm$^{-2}$ for at least 10 seconds, and preferably for at least 500 seconds to several minutes.

In an embodiment the step of electrodepositing comprises placing the textile or polymer substrate within an electro deposition solution, wherein the electro deposition solution comprises a phosphor buffer solution, p-toluenesulfonic acid (pTSA) and pyrrole monomer.

In an embodiment the noble metal sheet comprises gold leaf.

In an embodiment the step of compressing comprises gilding the gold leaf onto the textile or polymer substrate.

In an embodiment the substrate comprises a polyester textile sheet or a polyurethane polymer sheet.

In accordance with a further aspect the present invention comprises a method of constructing an energy storing electrical device comprising the steps of:
constructing a first electrode,
constructing a second electrode,
sandwiching an electrolyte between the first electrode and the second electrode,
immersing a separator into the electrolyte such that the separator is disposed between the first and second electrodes,
wherein each electrode comprises a first layer and a second layer, the second layer comprising a textile or polymer substrate and a noble metal disposed on the substrate.

In an embodiment the first electrode and the second electrode are formed by:
providing a textile or polymer substrate,
placing the textile or polymer substrate onto a noble metal sheet,
compressing the textile or polymer substrate into the noble metal sheet for a time period such that the noble metal attaches to the textile or polymer substrate,
electrodepositing a conductive material.

In an embodiment the conductive material is a polypyrrole and the polypyrrole is electrodeposited onto the textile or polymer substrate.

In an embodiment the step of electrodepositing comprises electrodepositing polypyrrole nanorods at a constant current of 0.8 mA cm$^{-2}$ for at least 10 seconds, and preferably for at least 500 seconds to several minutes.

In an embodiment the step of electrodepositing comprises placing the textile or polymer substrate within an electro deposition solution, wherein the electro deposition solution comprises a phosphor buffer solution, p-toluenesulfonic acid (pTSA) and pyrrole monomer.

In an embodiment the noble metal sheet comprises gold leaf.

In an embodiment the step of compressing comprises gilding the gold leaf onto the textile or polymer substrate.

In an embodiment the substrate comprises a polyester textile sheet or a polyurethane (PU) polymer sheet. Preferably when PU is used, the metal sheet may include a metallic material other than gold.

In an embodiment the electrolyte comprises $H_2SO_4$ and wherein the electrolyte is prepared by mixing $H_2SO_4$ with deionized water and a polyvinyl alcohol (PVA).

In an embodiment the separator comprises a non-woven cloth.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

As used herein the term synthetic textile or synthetic fabric mean the same thing. Both terms denote a chemically produced textile (or fabric) that is made by joining monomers into a polymer, via a polymerisation process. The synthetic textile looks like plastic strands spun together into an appropriate shape.

The terms textile and fabric may be interchangeably used to denote the same feature.

The term natural textile or natural fabric denote a naturally produced textile (or fabric) i.e. from natural sources e.g. plant based sources or animal based sources.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIGS. 5a, 5b, and 5c pictorially illustrate a method of constructing an energy storing electrical device.

FIGS. 6a, 6b, 6c, and 6d illustrate bending tests conducted on a fabricated electrode

FIG. 9a illustrates a plurality of CV curves for the supercapacitor incorporating the gold leaf gilded electrode FIG. 9b shows a plurality of GCD curves that were obtained through testing of the supercapacitor using the gold leaf gilded electrode FIG. 9c shows illustrates a plot of charging/discharge cycles of the supercapacitor as per FIG. 1.

FIGS. 10a, 10b, and 10c illustrate various deformations performed on the supercapacitor and the corresponding CV plots for each deformation tested.

DETAILED DESCRIPTION

The rapid development of smart electronic devices e.g. wearable electronic devices or smart garments has increased the need for high performance energy storage devices. Examples of commonly used energy storage electrical devices are supercapacitors or batteries. A supercapacitor is one example electrical device that is used in electronic devices e.g. smart electronic devices or wearable electronic devices to good cyclic stability and in some instances the ability to store large amounts of electrical energy. There is a need to develop a supercapacitor that is flexible and wearable. A supercapacitor includes a pair of electrodes and each electrode is coupled to a current collector. Commonly used materials to form electrodes are a stainless steel mesh, Ni foam or Ti mesh. Commonly used current collector materials are stainless steel yarn, nano carbon materials, carbon nanotube film, graphene sheets or carbon paper. However all of these materials are expensive, difficult to process, and are difficult to readily incorporate into wearable devices or garments.

The present disclosure is directed an energy storage electrical device that is substantially flexible. The energy storage electrical device is suitable for being used in wearable electronic devices due to its flexibility and low cost construction. The flexible energy storage electrical device can also be incorporated into garments e.g. clothes or other fabrics in order to create wearable electronic devices.

Figure 1:
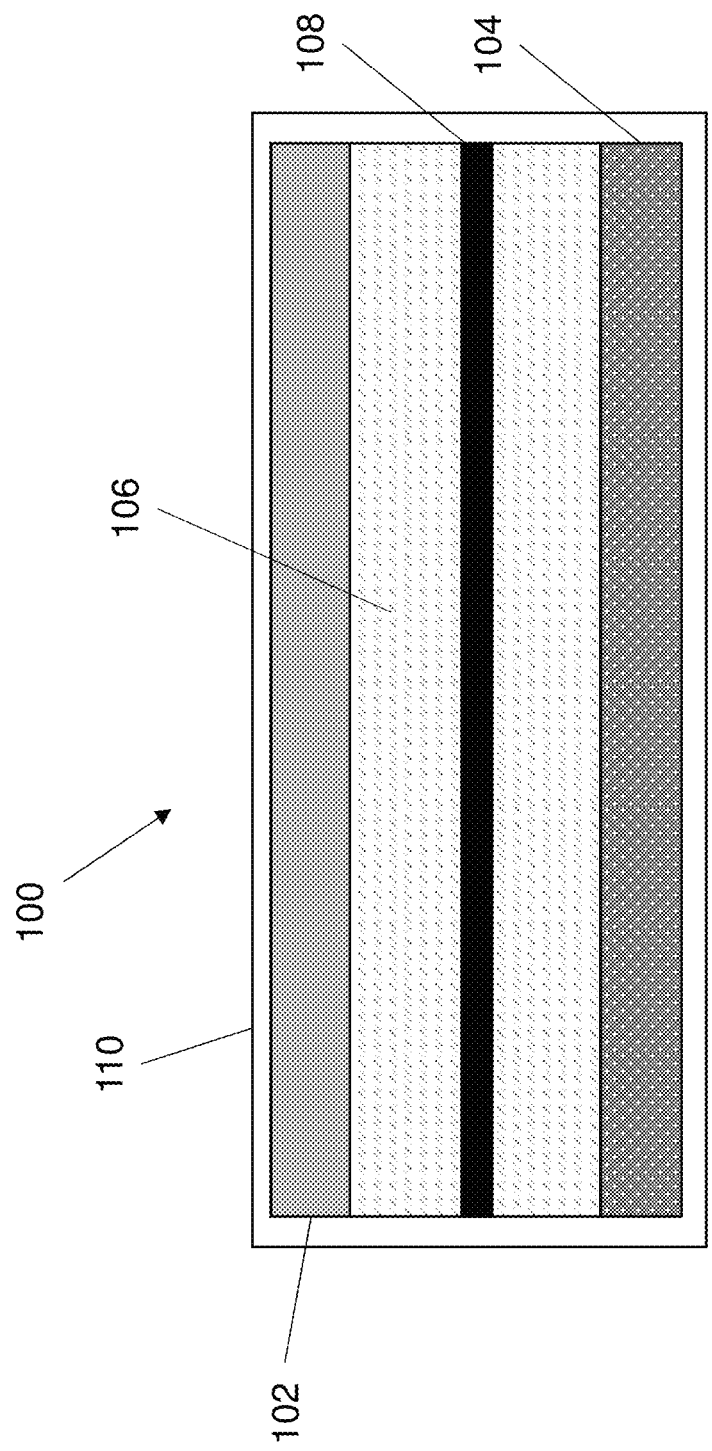
FIG. 1 illustrates an embodiment of an energy storing electrical device.

FIG. 1 shows an example embodiment of an energy storage electrical device 100. The energy storage electrical device 100 comprises a first electrode 102, a second electrode 104, an electrolyte 106 sandwiched between the first electrode 102 and second electrode 104 and a separator 108 disposed within the electrolyte 106 and between the electrodes 102, 104. The first and second electrodes 102, 104 have a similar construction to each other. Each of the electrodes 102, 104 is electrically conductive and is constructed to include at least one electrically conductive material. One of the electrodes may function as an anode and the other electrode may function as a cathode.

The electrolyte 106 comprises an electrically conductive fluid or gel or hydrogel sandwiched between the first electrode 102 and the second electrode 104. In one example configuration the electrolyte 106 comprises a hydrogel. The electrolyte 106 may include $H_2SO_4$, $Na_2SO_4$ or any other electrolyte/solution suitable for electrodepositing process. In one example the electrolyte comprises a gel that includes a mixture of PVA (polyvinyl alcohol) and $H_2SO_4$. The separator 108 comprises a non-woven cloth. The non-woven cloth may be any suitable cloth comprising a fabric that includes short or long fibres that are bonded together by a chemical, mechanical, heat or solvent treatment. The separator 108 is preferably immersed within the electrolyte 106 and positioned between the first electrode 102 and the second electrode 104. The separator 108 helps to maintain a distance between the first and second electrodes 102, 104 and hence prevent short circuit between the two electrodes 102, 104. The supercapacitor may include a housing 110 to hold all the components. The housing is formed from an electrically insulating material that is flexible e.g. a polymer or epoxy.

Each electrode comprises an integrated first layer and a second layer. The second layer comprises a substrate and a noble metal disposed on and attached to the substrate. The substrate comprises a textile portion or a polymer portion.

Figure 2:
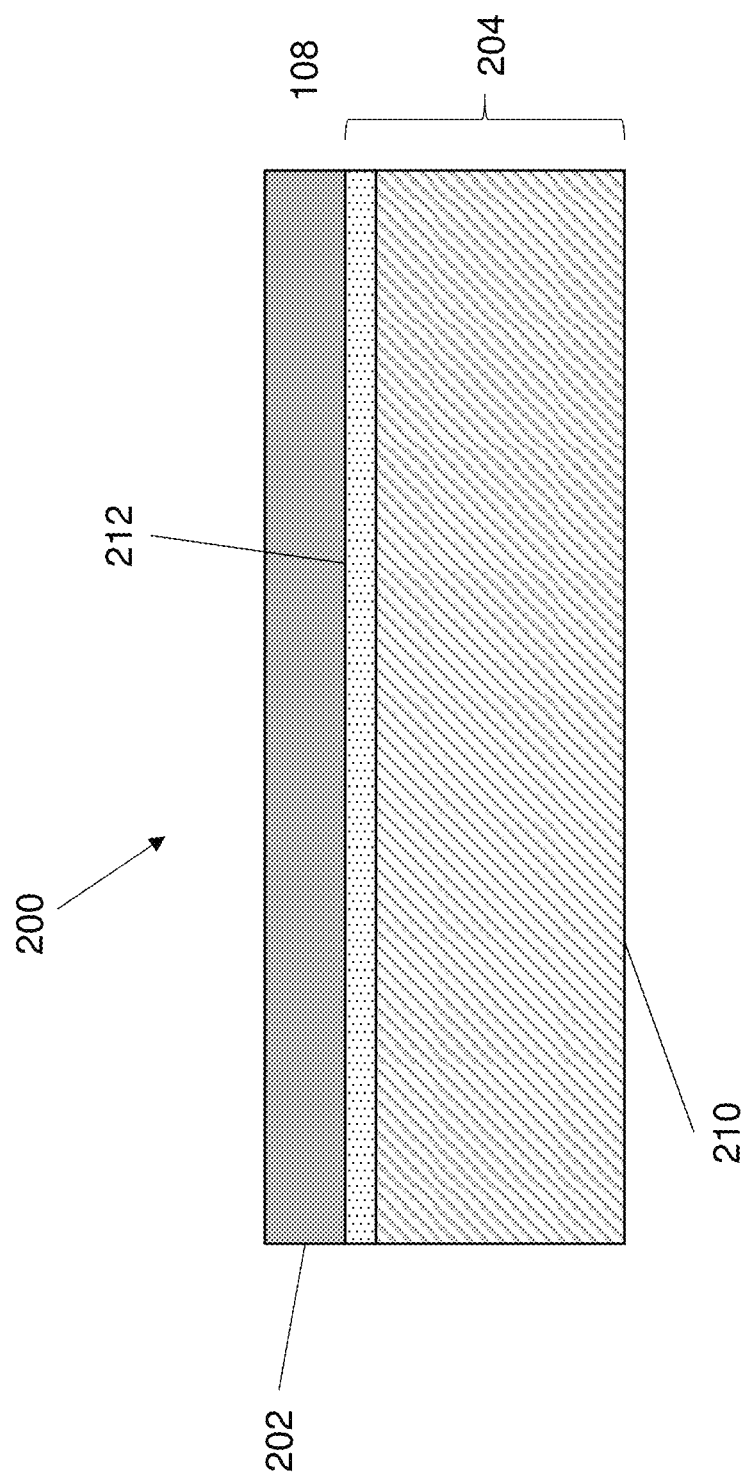
FIG. 2 illustrates an embodiment of an electrode for use in the energy storing electrical device of FIG. 1.

FIG. 2 shows an example embodiment of an electrode 200 for use in an energy storage electrical device. Each electrode 102, 104 used in the energy storage electrical device 100, as described with reference to FIG. 1, may be similar in structure and construction to the electrode 200.

Referring to FIG. 2, the electrode 200 comprises a first layer 202 and a second layer 204. The first layer 202 functions as an electrode layer and the second layer 204 functions as a current collector layer. The electrode 200 in the illustrated example of FIG. 2 is an integrated current collector and electrode. In the supercapacitor 100 the electrode layer generally functions to hold charge i.e. attract ions. The electrode layer can be polarized either positively or negatively. The current collector layer provides an electrically conductive pathway to couple to other electrical terminals. The current collector layer 204 preferably includes electrical terminals that connect the supercapacitor 100 into a circuit in order to charge/discharge the supercapacitor. The first layer 202 (i.e. electrode layer) and the second layer 204 (i.e. current collector layer) are arranged in electrical communication with each other. In the illustrated example the electrode layer 202 and the current collector layer 204 physically contact each other in order to conduct charge and allow charging/discharging of the supercapacitor.

The second layer 204 comprises a substrate 210 and a noble metal 212 disposed on and attached to the substrate 210. The noble metal forms a thin conductive layer 212 onto the substrate 210. The conductive layer 212 provides the substrate with electrical conductivity.

The noble metal 212 may be any suitable noble metal such as for example gold, silver, rhodium, palladium or platinum. Preferably the noble metal is gold. Gold is selected as to function as a conductive layer because it is electrochemically stable. This functionality is important for energy storage devices especially electrochemical or electrostatic energy storage devices such as for example supercapacitors. In additional gold is also very malleable, ductile and is easy to fabricate into very thin sheets, hence reducing the overall cost due to the very thin sheet of gold that can be applied.

The electrode 200 comprises a thin layer 212 of gold disposed on the substrate 210. The gold is preferably gold leaf that is applied to the substrate 210. The gold leaf is preferably deposited onto the substrate 210 by applying a gilding technique. Gilding is a known technique of applying gold leaf to various objects. The gilding technique results in a very thin layer of noble metal being disposed onto the substrate. Gilding may include positioning the substrate onto a gold leaf, and compressing the substrate into the gold leaf until the gold leaf attaches to the substrate.

The gold is applied as a very thin layer to form the conductive layer 212. The conductive layer 212 (i.e. the gold leaf layer) comprises a thickness of less than 0.3 µm. Preferably the gold is applied to form a layer (i.e. a conductive layer 212) comprising a thickness of between 0.05 µm and 0.15 µm. In one example the gold is applied as a layer comprising a thickness of 0.1 µm. The physical properties of gold e.g. its high ductility allow the gold to be applied as a thin layer, relatively simply. The thin layer of gold also reduces the overall cost as compared to other commonly used materials such as carbon nanotube or other noble metals etc. The layer of gold also has minimal effect or impact on the overall thickness of the second layer (i.e. current collector layer). The substrate layer 210 can be any suitable thickness depending on the size and performance requirements of the supercapacitor 100.

The current collector 204 is formed as a laminated structure. The electrode 200 also comprises a laminate structure including the electrode layer 202 and the current collector 204 layer. In the illustrated example the electrode 200 is a plate or sheet, having a rectangular cross section and a rectangular upper and lower face. Alternatively the electrode 200 may be formed into any other suitable shape such as an elliptical prism or cylindrical prism.

The substrate 210 may be a textile portion or a polymer portion. In the illustrated embodiment the substrate 210 comprises a textile material. As shown in FIG. 2, the textile material comprises a multi-faceted textile sheet. The noble metal (e.g. gold) is applied to a single face of the textile sheet. The substrate 210 may comprise a textile formed of natural or synthetic textile. In the illustrated embodiment the textile sheet comprises a polyester textile (i.e. a synthetic textile). The polyester textile may be provided as a sheet. Alternatively any other suitable synthetic textile can be used as the substrate 210. For example the substrate may comprise nylon or spandex or any other synthetic textile.

The polyester sheet is preferably electrically non-conductive. The gold leaf is applied to the polyester sheet 210 by a gilding process. The gilding process may be traditional gilding process that applies a thin gold leaf onto a surface (i.e. face) of the polyester sheet. The polyester sheet is generally negatively charged since the polyester fibres carry a negative charge. The gold is attracted to the negatively charged polyester fibres and is held onto the polyester sheets due to strong electrostatic interaction. The strong electrostatic attraction also provides a tightly laminated structure. The electrostatic attraction results in an even laminated structure of gold leaf on top of the polyester sheet.

The electrode layer 202 (i.e. first layer 202) comprises a conductive material. The conductive material can be electrostatically charged when the supercapacitor is in use. The electrode layer 202 material comprises polypyrrole (PPy). The layer of polypyrrole 202 comprises polypyrrole nanorods that are electrodeposited onto second layer 204 to form the first layer 202. The polypyrrole nanorods may be electrodeposited onto the gold leaf or onto the textile fabric. In the illustrated embodiment the polypyrrole is electrodeposited onto the substrate 210. Preferably the PPy is disposed on the gold layer of the substrate, such that the PPy is in contact with the gold. The PPy is always disposed onto the substrate but preferably the PPy is deposited onto the gold layer and in contact with the gold. Alternatively the PPy may be deposited on the textile layer.

The polypyrrole (PPy) nanorods may be electrodeposited in a lattice structure. The polypyrrole nanorods comprise a length of between 100 nm and 200 nm. The nanorods may be grown i.e. formed onto the substrate.

Alternatively the layer of polypyrrole may comprise polypyrrole nanowires that are electrodeposited onto the second layer to define the first layer. or the layer of polypyrrole may be provided as a film of polypyrrole material.

Figure 2A:
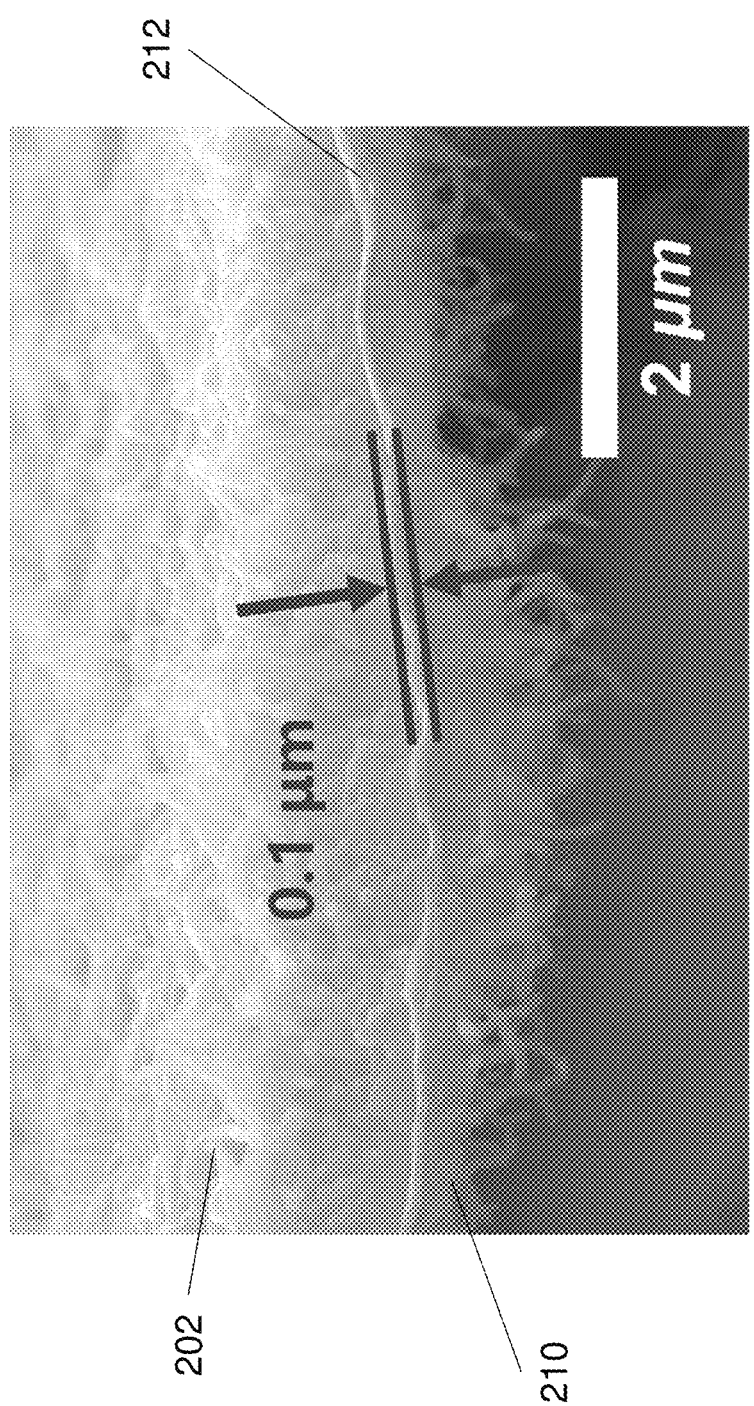
FIG. 2a illustrates a SEM view of the electrode.

FIG. 2a illustrates a scanning electron microscope (SEM) image of the electrode 200. FIG. 2a illustrates the substrate 210 comprising a plurality of polyester fibres. The gold leaf 212 (i.e. conductive layer 212) is intimately attached to the substrate 210. As shown in FIG. 2a the gold leaf 212 has a thickness of 0.1 µm. The substrate 210 also includes a layer of polypyrrole 202 that is disposed onto the substrate. In this specification the PPy is preferably deposited on the gold leaf i.e. on the conductive layer 212, and depositing on the substrate may mean either on the gold leaf or textile. In the illustrated embodiments the PPy is deposited onto the conductive layer. In alternative configurations the PPy may be deposited on the textile substrate. FIG. 2a shows a unitary structure of the electrode 200 that includes a substrate 210, a conductive layer 212 and an electrode layer 202.

The electrode layer 202 may also comprise a doping agent that is introduced during the electro deposition process to improve the electro deposition. The concentration of the doping agent and the deposition duration time can create a preferred structure of polypyrrole nanorods. For example the concentration of the doping agent and the deposition time can affect the density of nanorods (i.e. the number of nanorods) and the thickness of the polypyrrole layer. The doping agent may be p-toluenesulfonic acid (pTSA). In one example the pTSA concentration is around 0.04M. This concentration of pTSA was found to be an optimal. Preferably the polypyrrole nanorods are evenly grown on the substrate 210 thereby forming a continuous conductive network. This is advantageous because the electrode layer has the functionality of fast ion transportation and fast electrochemical reaction during operation of the supercapacitor 100.

The electrode layer 202 and the current collector layer 204 are preferably formed as a single unitary structure. The electrode layer 202 and current collector 204 are formed as a single unit defining an electrode. Each electrode 102, 104 as described with reference to FIG. 1 may have the same structure as electrode 200 described with reference to FIG. 2.

Figure 3:
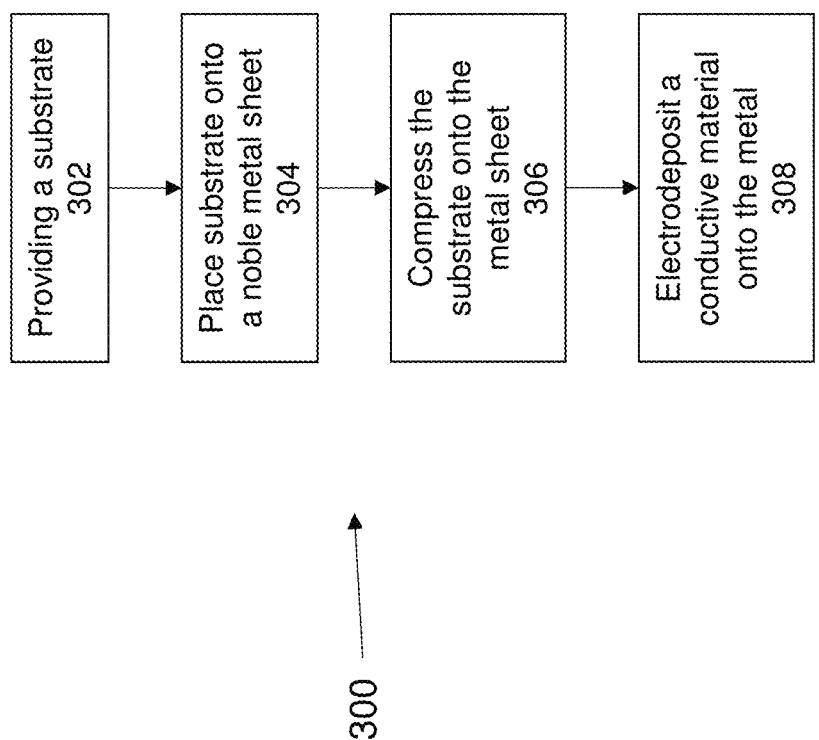
FIG. 3 shows a flow chart of a method of constructing an electrode for use in an energy storing electrical device.

FIG. 3 shows a flow chart of a method of constructing an electrode 300 for use in an energy storing electrical device. The method 300 commences at step 302. Step 302 comprises providing a textile or polymer substrate. Step 302 may also include the additional step of cleaning the substrate to remove any surface dust or particles. The substrate can be cleaned and washed using acetone, ethanol and deionized water. The substrate may be dried at a temperature for a particular time period e.g. at 80 degrees Celsius for 2 hours. The temperature and time duration does not alter the physical or chemical composition of the substrate.

Step 304 comprises placing the textile or polymer substrate onto a noble metal sheet. Step 306 comprises compressing the textile or polymer substrate into the noble metal sheet for a time period such that the noble metal attaches to the textile or polymer substrate. The noble metal is attached using a gilding technique. The gilding technique in this example comprises compressing the textile or polymer substrate into the noble metal sheet. The substrate may be compressed for several seconds to ensure intimate contact of the two components.

Alternatively step 306 may comprise pressing or brushing the metal sheet or metal leaf onto the substrate. Step 308 comprises electrodepositing a conductive material. The conductive material in this example is polypyrrole (PPy) nanorods. The PPy nanorods are preferably electrodeposited onto the substrate (i.e. onto the conductive layer) at 0 degrees Celsius with a constant current of 0.8 mA cm$^{-2}$ for 600 seconds. An electro deposition solution may be used to electrodeposit the nanorods onto the substrate. The electro deposition solution may include 30 ml of phosphor buffer solution, 0.4M pTSA as a doping agent (or any other suitable doping agent) and 300 μl pyrrole monomer.

The method 300 is used to form the electrode 200 as described earlier. The substrate as described with reference to the method 300 may comprise a polyester textile or a polyurethane (PU) film. The noble metal in this example is a gold leaf. Preferably, when PU is used, the metal sheet may include a metallic material other than gold.

Figure 4:
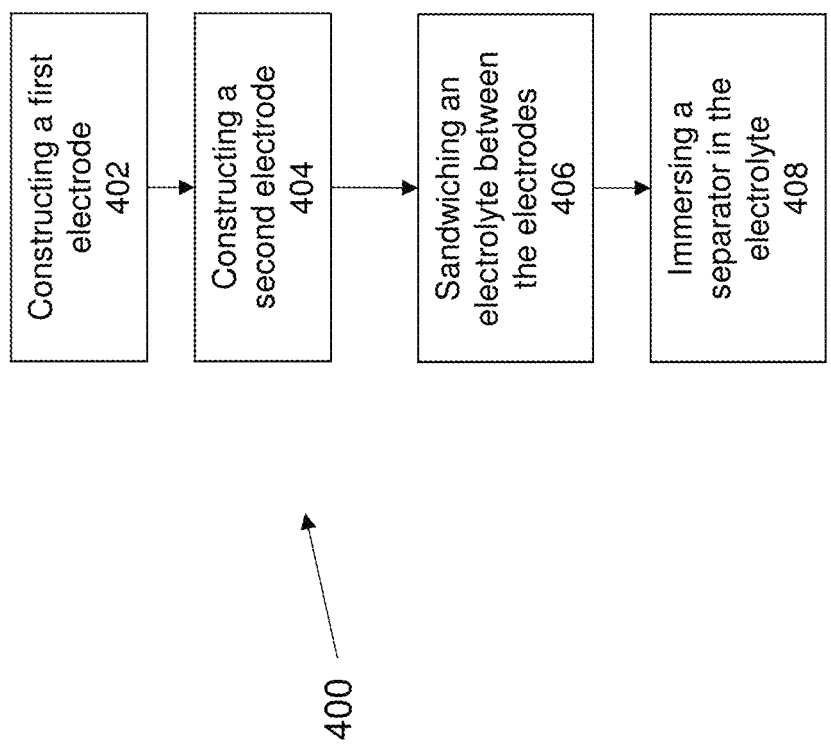
FIG. 4 shows a flow chart of a method of constructing an energy storing electrical device.

FIG. 4 shows a method 400 of forming an energy storing electrical device. The energy storing electrical device is a supercapacitor. The method 400 is used to form the supercapacitor 100 as described earlier. The method commences at step 402. Step 402 comprises constructing a first electrode. Step 404 comprises constructing a second electrode 404. Step 406 comprises sandwiching an electrolyte between the first electrode and the second electrode. The electrode 406 in this example comprises a mixture of PVA and $H_2SO_4$ electrolyte. The electrolyte is preferably prepared by mixing 6 g of $H_2SO_4$, 6 g PVA and 60 ml deionized water together. The mixture is heated to at least 90 degrees Celsius, preferably with continuous stirring for at least 15 minutes.

Step 408 comprises immersing a separator into the electrolyte such that the separator is disposed between the first and second electrodes. The separator is non-woven fabric and may optionally immersed within the electrolyte prior to positioning the separator between the two electrodes. For example the separator may be immersed in the electrolyte for at least 10 seconds and then placed between the two electrodes to act as a separator to avoid short circuits.

Each electrode comprise a first layer and a second layer, wherein the second layer comprises a textile or polymer substrate and a noble metal disposed on the substrate. Each electrode may be constructed by the method 300 as described earlier. Steps 402 and 404 may each comprise a plurality of sub-steps. Each step 402, 404 may include all the steps of method 300 as described earlier (i.e. the method of constructing an electrode). For example each step 402, 404 may include the additional sub-steps of providing a textile or polymer substrate, placing the textile or polymer substrate onto a noble metal sheet, compressing the textile or polymer substrate into the noble metal sheet for a time period such that the noble metal attaches to the textile or polymer substrate and electrodepositing a conductive material onto the substrate.

FIGS. 5a to 5c pictorially illustrates method of constructing an energy storing electrical device. FIG. 5a shows the step of providing a textile substrate 510. As shown in FIG. 5a, the textile substrate may a pristine cloth meaning a cleaned and washed cloth (i.e. textile substrate). FIG. 5a illustrates that the textile substrate 510 is negatively charged. As shown in FIG. 5a, each strand of the textile substrate 510 carries negative charges.

FIG. 5b shows the step of applying a noble metal 512 onto the substrate 510. The noble metal is a gold, in particular gold leaf that is applied to the substrate 510 by a gilding technique as described earlier. The gold leaf is positively charged. The difference in charge polarities of the substrate and noble metal creates a strong electrostatic attraction between the noble metal and the substrate, as described earlier.

FIG. 5c illustrates a layer of polypyrrole (PPy) 502 being disposed on the substrate. The PPy layer 502 is achieved by an electro deposition process as described with reference to FIG. 4. The PPy is disposed on the substrate, but in contact with the gold layer. The PPy nanorods are deposited in contact with the gold metal i.e. the gold layer.

The construction of the electrode as described i.e. including a textile substrate with gold leaf attached to the textile substrate, provides a highly flexible and mechanically robust electrode. The electrode is flexible in at least one axis. The particular construction is advantageous because the electrode can be stretched, compressed, twisted and bent without degradation of performance or any damage to the electrode. This is achieved due to the flexibility of the textile substrate and due to the tight and intimate coupling of the gold to the textile.

FIGS. 6a to 6d illustrate mechanical testing that was conducted to illustrate the robustness of the electrode. FIG. 6a shows a gold leaf gilded cloth (GLGC) in an initial state which is a planar structure. The gold leaf gilded cloth 600 comprises a polyester sheet as a substrate with gold leaf gilded onto the polyester sheet. The gold leaf gilded textile 600 is a flexible sheet.

FIG. 6b shows a second state of the gold leaf gilded textile 600. The gold leaf gilded textile is bent in half. The textile 600 is bent along a transverse axis. The gold leaf gilded textile 600 was bent 1000 times. FIG. 6c shows an initial resistance measurement of the gold leaf gilded textile 600, prior to performing 1000 bending cycles. FIG. 6d shows a second resistance measurement when the gold leaf gilded textile 600 after performing 1000 bending cycles. The resistance measurement was performed using a multi-meter. As shown in FIGS. 6c and 6d, the resistance value remains almost unchanged even after 1000 bending cycles. The gold leaf remains firmly laminated on the polyester textile. This makes the electrode constructed in this manner advantageous because it is highly bendable, flexible without greatly altering or deteriorating the electrode's functionality. Traditional electrode constructions e.g. using carbon nanotubes or carbon cloths tend to break or crack when bent and deformed. Such traditional electrodes often also deteriorate in performance after multiple deformations. The electrode as described herein is advantageous since it is flexible enough to experience large elastic deformations and maintain performance in response to a deformation. This makes the electrode constructed using a textile or polymer substrate with gold leaf gilded onto the substrate particularly suited for use in wearable electronics or wearable electronic devices as compared to traditional electrode constructions, as compared to traditional electrodes.

Figure 7A:
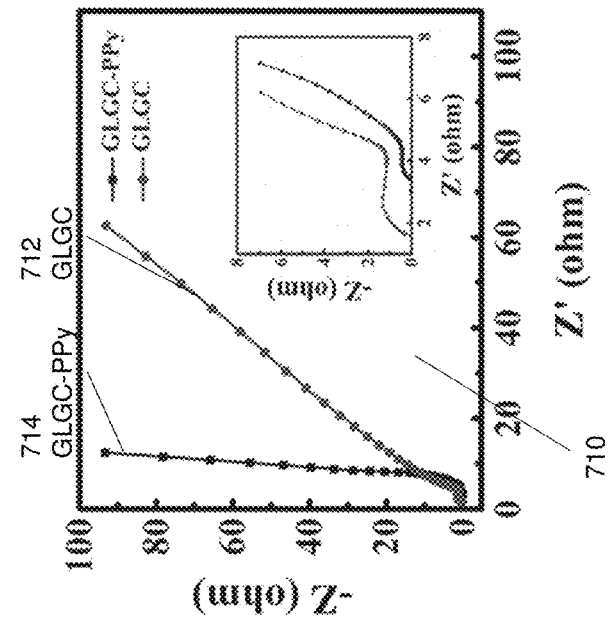
FIG. 7a illustrates a CV (capacitance voltage profiling) curve of the electrode including only the substrate and noble metal and the electrode including an electrode layer.

The electrochemical performance of the electrode based on the gold leaf gilded substrate (e.g. electrode 200) was evaluated by a three electrode system. FIG. 7a illustrates a CV (capacitance voltage profiling) curve 700 of the electrode including only the substrate and noble metal and the electrode including an electrode layer. As shown in FIG. 7a, the curve 702 is the CV curve of the substrate with gold leaf only. Curve 704 shows a CV curve of the substrate with polypyrrole nanorods on the substrate. Based on the CV curves the main capacitance of the electrode is attributed to the PPy nanorods because of the shape of the CV curve. Once the PPy nanorods are added, there is a charge and discharge element to the CV curve, thereby showing that capacitance is attributed to the PPy nanorods.

Figure 7B:
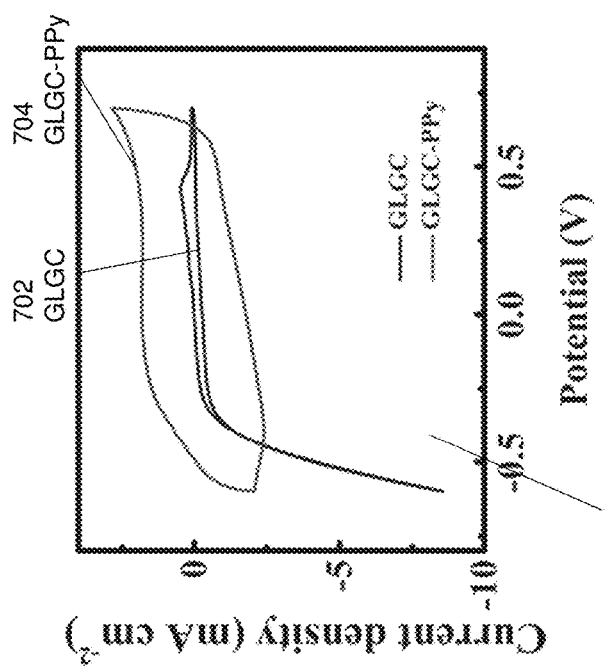
FIG. 7b illustrates an EIS spectra curve of the electrode including only the substrate and noble metal and the electrode including an electrode layer.

FIG. 7b illustrates an EIS spectra curve 710 of the electrode including only the substrate and noble metal and the electrode including an electrode layer. Curve 712 is an EIS spectra of the substrate with gold leaf only. Curve 714 is the EIS spectra of the substrate with the gold leaf and the PPy nanorods deposited on the substrate. As shown in FIG. 7b, the charge transfer resistance of the substrate increased after the PPy nanorods were added. This results from the synergistic effect of the gold leaf and textile substrate and effective doping effect of pTSA. The curve 710 illustrates the existence of a conductive network in the integrated electrode, which is helpful for fast ion transportation during charging and discharging.

Figure 8:
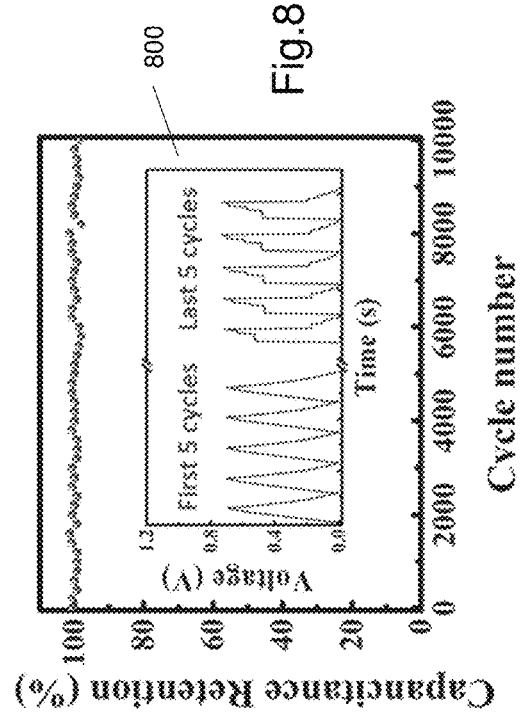
FIG. 8 illustrates a plot 800 of charging/discharging cycles of the electrode as described in FIG. 2.

Poor cycling stability can be an issue for traditional electrodes that include polypyrrole because of repeated swelling and shrinking the polypyrrole layer during charging and discharging. This can cause eventual structural pulverisation. Gold leaf is highly conductive and is very ductile and malleable. The gold leaf can act as a conductive buffer layer to alleviate the structural deterioration of the PPy during repeated charging/discharging. FIG. 8 illustrates a plot 800 of charging/discharging cycles of the electrode of FIG. 2 for 10,000 cycles. The electrode of FIG. 2 was charged and discharged 10,000 times and the capacitance retention was plotted. The plot 800 illustrates the first 5 and last 5 cycles and shows that 98.7% of the original capacitance was retained. The electrode as described herein is a strong and stable electrode.

A supercapacitor incorporating the electrode as described herein including a textile substrate, gold leaf and PPy layer was tested to check performance of a supercapacitor. The supercapacitor tested is similar to the one described with reference to FIG. 1. FIG. 9a illustrates a plurality of CV curves for the supercapacitor incorporating the gold leaf gilded electrode (e.g. electrode 200). The CV curves remain a quasi-rectangular shapes at a variety of scan rates. The scan rates varied from 5 mVs$^{-1}$ to 200 mVs$^{-1}$. The quasi-rectangular shapes at variety of scan rates indicate high reversibility. FIG. 9b shows a plurality of GCD curves that were obtained through testing of the supercapacitor using the gold leaf gilded electrode. The quasi-triangular shapes illustrate a highly reversible electrochemical reaction. The areal capacitance reaches a high value of 17.14 mF cm$^{-2}$ at 0.2 mA cm$^{-2}$. FIG. 9c illustrates a plot 910 of charging/discharge cycles of the supercapacitor as per FIG. 1. The supercapacitor was cycled for 3000 cycles. As per FIG. 9c the supercapacitor retains 99% of its original capacitance over 3000 cycles. This in contrast to other known supercapacitors e.g. solid state supercapacitors is a vast improvement, since solid state supercapacitors retain a lower percentage of their original capacitance. The supercapacitor 100 as described is advantageous because it is flexible, maintains capacitance and performance over many uses.

Figure 10B:
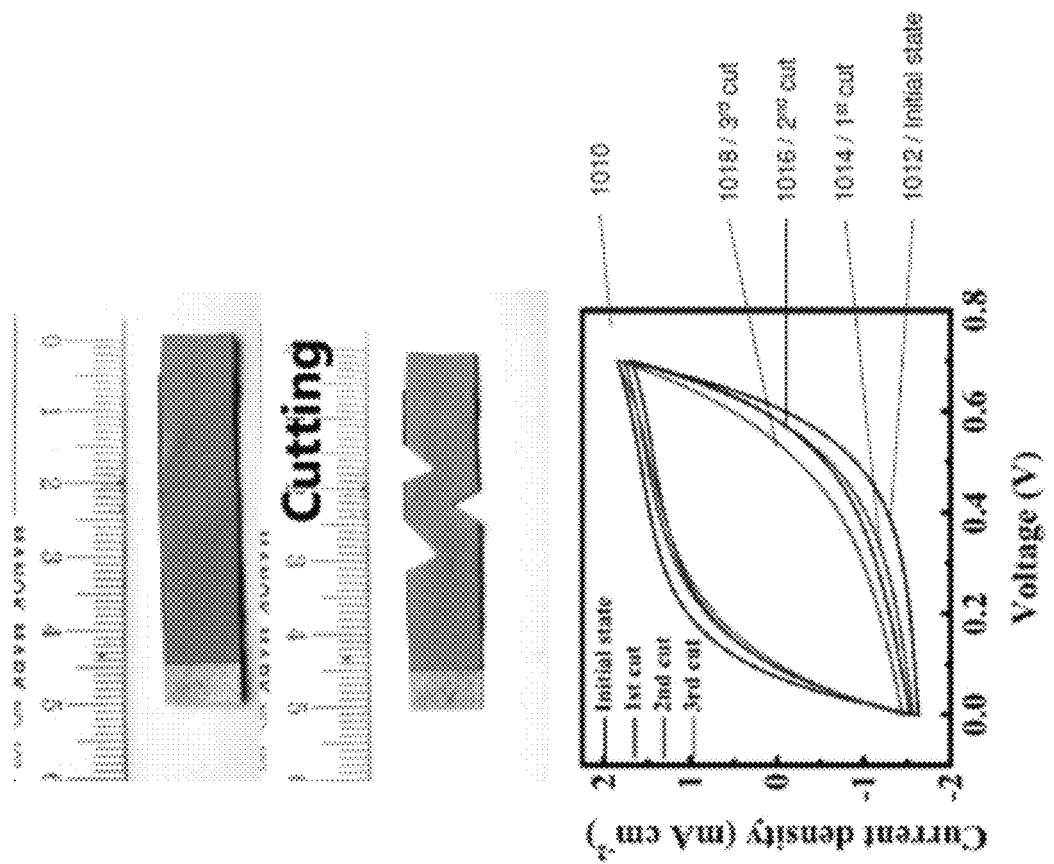

FIGS. 10a to 10c illustrate various deformations performed on the supercapacitor and the corresponding CV plots for each deformation tested. The CV plots illustrate the performance of the supercapacitor.

FIG. 10a shows the supercapacitor being bent approximately 90°. The corresponding CV plot 1000 shows a curve 1002 corresponding to an initial state (i.e. unbent state) and a curve 1004 corresponding to the bent state. As can be seen from FIG. 10a, the curves 1002 and 1004 are substantially similar indicating the supercapacitor maintains most of its performance even when bent, respectively.

FIG. 10b shows the supercapacitor being cut at multiple locations along the supercapacitor. The plot 1010 shows a plurality of curves that correspond to various cuts. The curve 1012 corresponds to the initial state of the supercapacitor. Curve 1014 corresponds to a first cut, curve 1016 corresponds to a second cut and curve 1018 corresponds to a third cut being made in the supercapacitor. As can be seen from plot 1010, the curves 1012 to 1018 are very similar in shape to each other thereby showing minimal degradation in capacitance even when the supercapacitor is cut.

FIG. 10c shows a breathable supercapacitor being formed as a breathable supercapacitor. The supercapacitor is made breathable by punching a number of through-holes that would enhance comfort of the supercapacitor. FIG. 10c shows the supercapacitor comprising a number of large holes, and the arrows indicate transfer of moisture and/or excess heat. The holes may be punched by needles and may be any suitable diameter such as for example approximately 60 μm. As can be seen on the plot 1020 the curve 1022 corresponds to an initial state of the supercapacitor and curve 1024 corresponds to the supercapacitor after holes have been punched into the supercapacitor. Again the curves 1022 and 1024 are substantially similar to each other in shape, again indicating that the capacitance does not change greatly even after holes are punched into the supercapacitor.

As illustrated in FIGS. 10a to 10c the supercapacitor can be deformed or cut or punched with holes without greatly deteriorating the capacitance and performance of the supercapacitor. This functionality is achieved due to the flexible substrate and the tight bond formed between the golf leaf and the substrate after the gilding process. The flexible substrate used to form the supercapacitor is particularly helpful in improving the flexibility in multiple axes of the supercapacitor. The use of the gold also adds to the flexibility of the supercapacitor due to the high malleability and ductility of gold. The supercapacitor includes a flexible non-woven cloth separator that prevents short circuits between the electrodes even when the supercapacitor is bent.

Figure 11A:
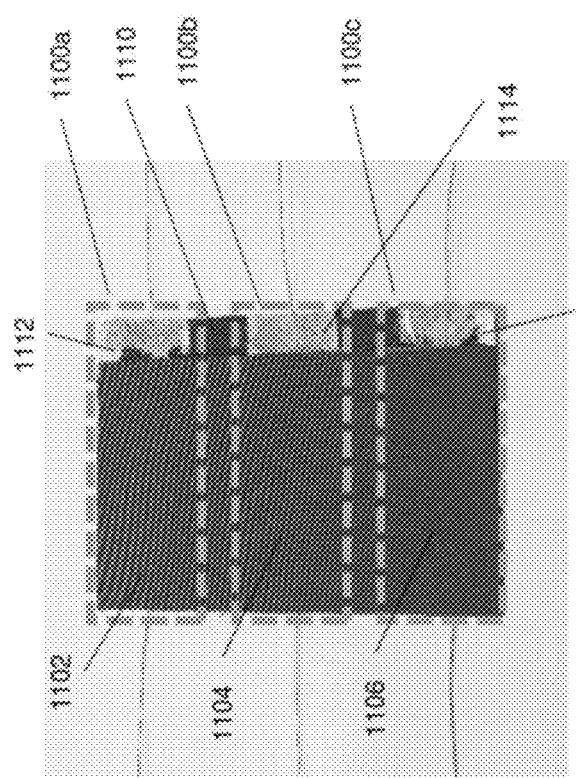
FIG. 11a shows an example embodiment supercapacitor comprising multiple supercapacitor modules.
Figure 11B:
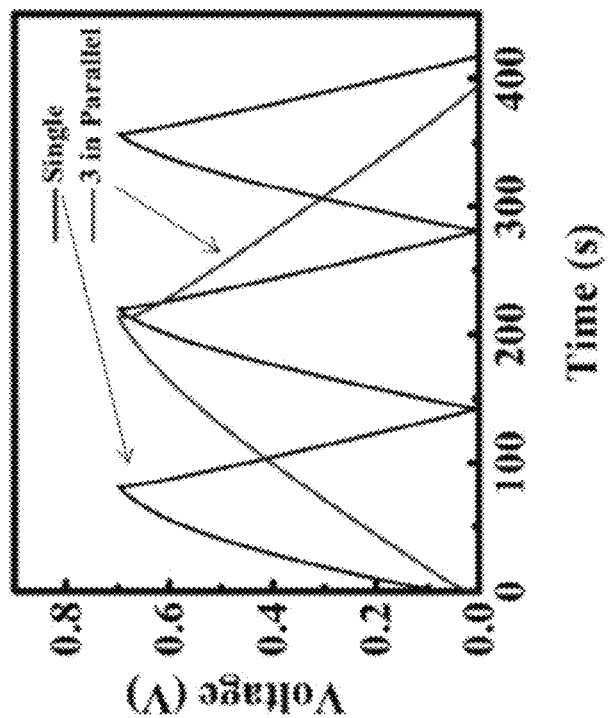
FIG. 11b shows the GCD curves of three single capacitors and one combined triple capacitor.

A narrow working potential window and relatively low energy density are two typical problems that wearable supercapacitors may incur. One solution is to connect multiple supercapacitors in series or parallel. However, most connected modules are difficult to incorporate into a flexible and comfortable device for use in wearable devices. This is because the interconnections are loose and are usually connected by thin wires that can break in daily use. The use of gold leaf is advantageous because it is flexible, malleable and ductile. Further the gold leaf offers the conductivity and the polyester fabric is non-conductive, which allows easier control of the conductive area and its shape by patterning the gold leaf. The PPy nanorods can be electrodeposited onto the target area. FIG. 11a shows an example embodiment supercapacitor 1100 comprising multiple supercapacitor modules 1100a, 1100b, 1100c. The supercapacitor 1100 comprises three PPy modules 1102, 1104, 1106 formed on a single piece of polyester textile 1110. The single piece of polyester textile 1110 is laminated with three columns of gold leaf 1112, 1114 and 1116. The construction 1100 is actually three supercapacitors (i.e. 3 supercapacitor modules) formed on a single substrate 1110 (i.e. polyester textile). The PPy nanorods may be independently electrodeposited onto the three separate gold leaf columns. By combining the three supercapacitors the overall capacitance is also increased. For example the capacitance is trebled in this example. FIG. 11b shows the GCD curves of three single capacitors and one combined triple capacitor. The supercapacitor modules 1100a, 1100b, 1100c can be formed and connected in series or parallel depending on the application. The supercapacitor 1100 provides a flexible, comfortable, compact design with high energy density.

Some alternative embodiments (i.e. configurations) of the supercapacitor and or electrode are described below. These alternative configurations can be substituted for the configurations described earlier.

In an alternative embodiment of the electrode, the electrode may comprise a substrate formed of a polymer sheet instead of a textile sheet. The polymer sheet may be formed as a thin film to provide a flexible substrate. The polymer sheet may be formed of any suitable polymer. In one configuration the polymer sheet may comprise a polyurethane film. The polyurethane film is preferably electrically non-conductive. The gold leaf is applied to the polyurethane film by a gilding process in order to form an electrically conductive substrate. The polyurethane film may be negatively charged in order to enhance the electrostatic attraction between the golf leaf and the polyurethane film. The polyurethane film can also be attached to wearable articles such as for example garments or clothing articles. The polyurethane film is also advantageous because it provides a flexible substrate that can be integrated with garments to create wearable electrical devices. A supercapacitor incorporating the polyurethane film is also advantageous because the polyurethane film can be incorporated into wearable electrical devices and allows the supercapacitor to be substantially flexible with good mechanical properties e.g. high tensile and compression flexibility as well as torsional flexibility.

In a further alternative embodiment the supercapacitor 300 may comprise a three electrode configuration. The supercapacitor may include a working electrode, a counter electrode and a reference electrode. In this alternative embodiment the working electrode comprises a textile substrate with a layer of gold such as for example electrode 200 as described. The counter electrode comprises a platinum mesh or another noble metal mesh. The reference electrode may comprise a saturated calomel electrode. The electrolyte can be sandwiched or disposed between each of the three electrodes. The electrolytes may also cover each of the electrodes. In this alternative embodiment a non-conductive separator may be disposed between each of the electrodes to avoid a short circuit.

In another alternative embodiment the supercapacitor may be constructed to breathable. This is particularly useful when incorporating the supercapacitor into garments for use in wearable electronics. The substrate may be formed of a breathable material such as cotton or flax or linen or a commercial fabric like GoreTex. Alternatively the substrate may include holes punched into it after the gold leaf is applied or the holes may be punched once the supercapacitor is fabricated. The supercapacitor can still function even when breathable.

The description of any of these alternative embodiments is considered exemplary. Any of the alternative embodiments and features in the alternative embodiments can be used in combination with each other or with the embodiments described with respect to the figures.

The supercapacitor as described herein is advantageous because it provides a flexible, comfortable device that can be incorporated into wearable devices. The fabric substrate can be easily incorporated into garments e.g. by sewing. The supercapacitor is also advantageous because it is lower cost than traditionally used materials and can be easily fabricated. The easy fabrication allows custom shape fabrication as well as fabrication into multiple integrated and interconnected supercapacitors to provide a required energy density on a flexible device. The supercapacitor is also substantially wearable since it is textile compatible due to the substrate being made of a textile. The supercapacitor can also be cut into an appropriate shape and/or sewn into various shapes. The supercapacitor as described herein is also advantageous because it provides a safe to wear device with low toxicity or causticity and improved stability. The supercapacitor can operate even when deformed in multiple axes since the performance does not degrade substantially even when the supercapacitor is deformed e.g. bend, twisted, sheared etc.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

The invention claimed is:

1. An energy storing electrical device comprising:
a first conductive electrode,
a second conductive electrode,
an electrolyte disposed between the first conductive electrode and a second conductive electrode,
each electrode further comprising an integrated first layer defining an electrode layer and a second layer defining a current collector layer, and;
wherein the second layer comprises a laminated structure including a non-conductive substrate of a textile layer or a polymer layer and a conductive layer formed by a continuous layer of noble metal disposed on and attached to a top surface of the non-conductive substrate;
wherein the first layer comprises a layer of polypyrrole deposited on the non-conductive substrate or the conductive layer of the second layer, the layer of polypyrrole including polypyrrole nanostructures arranged in a lattice structure and in contact with the noble metal so as to form a continuous conductive network facilitating ion transportation and electrochemical reaction during an operation of the energy storing electrical device; and
wherein the layer of noble metal further operates as a conductive buffer layer to alleviate a structural deterioration of the polypyrrole nanostructure caused by the electrochemical reaction during the operation of the energy storing electrical device.

2. An energy storing electrical device in accordance with claim 1, wherein the noble metal is gold.

3. An energy storing electrical device in accordance with claim 2, wherein the gold is a gold leaf that is applied to the non-conductive substrate by a gilding process, the gold leaf being applied as a thin layer such that the gold leaf is laminated onto the non-conductive substrate.

4. An energy storing electrical device in accordance with claim 3, wherein the textile portion comprises a multi-faceted textile sheet and wherein the noble metal is applied onto a single face of the textile sheet.

5. An energy storing electrical device in accordance with claim 4, wherein the polymer portion comprises a multi-faceted polymer sheet and wherein the noble metal is disposed onto a single face of the polymer sheet.

6. An energy storing electrical device in accordance with claim 4, wherein the polymer sheet comprises a polyurethane polymer sheet.

7. An energy storing electrical device in accordance with claim 3, wherein the textile portion is a polyester textile.

8. An energy storing electrical device in accordance with claim 2, wherein the gold is applied as layer comprising a thickness of less than 0.3 µm.

9. An energy storing electrical device in accordance with claim 2, wherein the gold is applied as a layer comprising a thickness between 0.05 µm and 0.15 µm.

10. An energy storing electrical device in accordance with claim 9, wherein the polyester textile electrically non-conductive.

11. An energy storing electrical device in accordance with claim 10, wherein the polyurethane polymer sheet is electrically non-conductive.

12. An energy storing electrical device in accordance with claim 1, wherein the noble metal is gold and the gold is deposited onto the non-conductive substrate by a gilding process.

13. An energy storing electrical device in accordance with claim 1, wherein the second layer comprises a textile portion and a noble metal being applied to the textile portion.

14. An energy storing electrical device in accordance with claim 1, wherein the second layer comprises a polymer portion and a noble metal being applied to the polymer portion.

15. An energy storing electrical device in accordance with claim 1, wherein the non-conductive substrate the textile portion or the polymer portion is negatively charged, the noble metal being positively charged and the noble metal being retained on the non-conductive substrate by electrostatic interaction.

16. An energy storing electrical device in accordance with claim 1, wherein the layer of polypyrrole comprises polypyrrole nanostructures of polypyrrole nanorods or polypyrrole nanowires that are electrodeposited onto the second layer to define the first layer.

17. An energy storing electrical device in accordance with claim 1, wherein the electrolyte comprises an electrically conductive fluid or gel or hydrogel sandwiched between the first electrode and the second electrode.

18. An energy storing electrical device in accordance with claim 1, wherein the electrolyte comprises $H_2SO_4$.

19. An energy storing electrical device in accordance with claim 1, wherein the energy storing electrical device comprises a separator disposed between the first electrode and the second electrode.

20. An energy storing electrical device in accordance with claim 19, wherein the separator comprises a non-woven cloth.

21. An energy storing electrical device in accordance with claim 1, wherein the first layer is an electrode layer and the second layer is a current collector layer, wherein the electrode layer and the current collector layer are formed as a single unit and the single unit defining each of the first conductive electrode and second conductive electrode.

22. An energy storing electrical device in accordance with claim 1, wherein each electrode is substantially flexible about at least one axis.

23. An energy storing electrical apparatus, comprising a plurality of interconnected energy storing electrical devices in accordance of claim 1, a common substrate forming the non-conductive substrate of each of the plurality of energy storing electrical device; and an electrical connection arranged to electrically connect the plurality of energy storing electrical device.

24. An electrode for use in an energy storing electrical device comprising:
a first layer defining an electrode layer,
a second layer defining a current collector layer coupled to the first layer,
wherein the second layer comprises a laminated structure including a non-conductive substrate of a textile layer or a polymer layer and a conductive layer formed by a continuous layer of noble metal disposed on and attached to a top surface of the non-conductive substrate;
wherein the first layer comprises a layer of polypyrrole deposited on the non-conductive substrate or the conductive layer of the second layer, the layer of polypyrrole including polypyrrole nanostructures arranged in a lattice structure and in contact with the noble metal so as to form a continuous conductive network facilitating ion transportation and electrochemical reaction during an operation of the energy storing electrical device; and wherein the layer of noble metal further operates as a conductive buffer layer to alleviate a structural deterioration of the polypyrrole nanostructures caused by the electrochemical reaction during the operation of the energy storing electrical device.

25. An electrode for use in an energy storing electrical device in accordance with claim 24, wherein the current collector layer and the electrode layer integrated together and forming a single unit defining the electrode for use in an energy storing electrical device.

26. An electrode for use in an energy storing electrical device in accordance with claim 24, wherein the noble metal is gold.

27. An electrode for use in an energy storing electrical device in accordance with claim 26, wherein the gold is a gold leaf that is applied to the non-conductive substrate by a gilding process, the gold leaf being applied as a thin layer such that the gold leaf is laminated onto the non-conductive substrate.

28. An electrode for use in an energy storing electrical device in accordance with claim 26, wherein the gold is applied as layer comprising a thickness of less than 0.3 μm.

29. An electrode for use in an energy storing electrical device in accordance with claim 26, wherein the gold is applied as a layer comprising a thickness between 0.05 μm and 0.15 μm.

30. An electrode for use in an energy storing electrical device in accordance with claim 26, wherein the polymer portion comprises a multi-faceted polymer sheet and wherein the noble metal is disposed onto a single face of the polymer sheet.

31. An electrode for use in an energy storing electrical device in accordance with claim 30, wherein the polymer sheet comprises a polyurethane polymer sheet.

32. An electrode for use in an energy storing electrical device in accordance with claim 31, wherein the polyurethane polymer sheet is electrically non-conductive.

33. An electrode for use in an energy storing electrical device in accordance with claim 24, wherein the noble metal is gold and the gold is deposited onto the non-conductive substrate by a gilding process.

34. An electrode for use in an energy storing electrical device in accordance with claim 24, wherein the current collector layer comprises a textile portion and a noble metal being applied to the textile portion.

35. An electrode for use in an energy storing electrical device in accordance with claim 34, wherein the textile portion comprises a multi-faceted textile sheet and wherein the noble metal is applied onto a single face of the textile sheet.

36. An electrode for use in an energy storing electrical device in accordance with claim 34, wherein the textile portion is a polyester textile.

37. An electrode for use in an energy storing electrical device in accordance with claim 36, wherein the polyester textile electrically non-conductive.

38. An electrode for use in an energy storing electrical device in accordance with claim 24, wherein the current collector layer comprises a polymer portion and a noble metal being applied to the polymer portion.

39. An electrode for use in an energy storing electrical device in accordance with claim 24, wherein the non-conductive substrate the textile portion or the polymer portion is negatively charged, the noble metal being positively charged and the noble metal being retained on the non-conductive substrate by electrostatic interaction.

40. An electrode for use in an energy storing electrical device in accordance with claim 24, wherein the layer of polypyrrole comprises the polypyrrole nanostructures of polypyrrole nanorods or polypyrrole nanowires that are electrodeposited onto the second layer.

\* \* \* \* \*